United States Patent Office 3,330,343
Patented July 11, 1967

3,330,343
VISCOSITY CONTROL IN MISCIBLE FLOODS
William C. Tosch and David N. Burdge, Littleton, Colo., assignors to Marathon Oil Company, Findlay, Ohio, a corporation of Ohio
No Drawing. Filed Sept. 9, 1963, Ser. No. 307,286
18 Claims. (Cl. 166—9)

This invention relates to the recovery of fluid hydrocarbons from subterranean formations by injecting into a formation a slug of soluble oil of modulated viscosity, driving the slug through the formation with a drive fluid, and recovering the displaced oil from the formation.

Petroleum may be recovered from subterranean formations by injecting a slug of soluble oil into the formation and driving the soluble oil slug through the formation with water. The soluble oil is compatible with petroleum and achieves an almost perfect recovery of oil from the portions of a formation swept. "Compatible" as used herein is synonymous with "miscible" except that the internal phase is substantially immiscible with the substance the external phase is designed to contact. The soluble oils utilized in the process of this invention are known as "microemulsions" [Schulman and Montagne, Annals of the New York Academy of Sciences, 92, pages 366–71 (1961)], olepathic hydromicelles [Hoar and Schulman, Nature, 152, page 102 (1943)], or transparent emulsions (Blair et al., U.S. Patent 2,356,205). Essentially these soluble oils comprise a highly stable, substantially transparent dispersion of water in hydrocarbon. This procedure is more fully described in copending U.S. patent application Ser. No. 212,134 filed on July 24, 1962.

The soluble oils used in petroleum recovery to date have used an alkylaryl naphthenic monosulfonate surfactant. The addition of water to these soluble oils increases their apparent viscosity. Apparent viscosity is defined as the ratio of shear stress to rate of shear, the shear stress exhibited by the liquid being the result of the particular rate of shear. For this reason, the viscosity of the soluble oil slug can vary from point to point. The sorption of water can occur in formations containing appreciable amounts of water; for example, in a tertiary flood undertaken after completion of a water flood. In such a situation, the leading edge of the slug of soluble oil as well as the trailing edge of the slug will contact large volumes of water and will tend to take up some of this water. The slug would also take up water from a slug of water-external emulsion which might be injected after the soluble oil to form a bank, of two slugs, which would be compatible at both the leading and trailing edges of the bank.

The viscosity of the soluble oil or emulsion can be regulated, in part, by controlling the amount of oil in the slug or by controlling the viscosity of the oil utilized; however, less expensive control mechanisms were needed. The present invention accomplishes this result.

We have now discovered that the addition of water-soluble salts to soluble oils effectively reduces the viscosity of these materials. This result is surprising as these materials are generally regarded as deleterious to the performance of surfactants.

A variety of salts exhibit the desired effect, though it appears that, generally, the maximum allowable salt concentration range decreases as the valence of the ion making up the salt increases. Stated another way, viscosity-reducing activity, on an equimolar basis, would be as follows for the listed alkali metal salts; citrate>sulfate>thiocyanate>chloride>nitrate>acetate.

The amount of salt required to provide a given viscosity reduction will vary with the amount of viscosity reduction desired. It appears that the maximum allowable salt concentration varies with the percentage of water and/or alcohol present and the particular sulfonate utilized. Generally, no more than about 1–4 grams of salt per liter slug material are needed for effective viscosity reduction.

The required salt percentage for a desired viscosity change and the maximum allowable salt content of a particular slug composition can be determined routinely by adding various amounts of salt to aliquots of the emulsion or soluble oil.

Viscosity control can be achieved in an oil recovery by introducing salts into portions of the soluble oils which are primarily in contact with water. Thus, the salt concentration of a slug would be increased at the leading edge of the slug and the trailing edge of the slug in a situation where the slug is to be introduced into a formation having a high concentration of water and where the slug is to be followed by a water drive. The salt concentration should be sufficient to reduce the viscosity of the treated portions of the slug below the viscosity of the major portion of the slug. The salt concentration should be such that the viscosity of the treated portions of the slug will increase to the viscosity of the remaining slug on being mixed with formation waters and drive water. Alternately, the salt concentration can be employed to minimize viscosity increases in those portions of the slug which contact appreciable amounts of water. If temperature stability is required in a high temperature formation, the desired amount of salt is introduced into the total slug in order that separation will not occur in a portion of the slug.

The viscosity of a salt-treated soluble oil is lower than viscosity of an untreated sulfonate solution. The viscosity of a soluble oil in contact with formation water, which it drives along with the oil in the formation, rises as water is mixed into the slug. The salt-treated portion of a soluble oil injected last also increases in viscosity on contact with a water drive or with a water-external emulsion slug which is, in turn, driven by water. The amount of viscosity increase, in both instances, will depend on the amount of water mixed into the soluble oil slug. The final viscosity is always lower than it would be without the salt treatment. This result occurs because (a) it is desirable to inject into a formation a soluble oil which contains an excess of oil sufficient to enable a considerable amount of water to be mixed into the soluble oil while retaining the oil-external character of the system and (b) high oil-content soluble oils have lower apparent viscosities than do higher water-content soluble oils and the viscosities of the high oil-content soluble oils increase as water is mixed into the soluble oil.

Normally, each treated portion need be only 5–10% of the total soluble oil slug. Larger or smaller amounts can be treated if the situation demands.

The term soluble oil, as used in this application, includes the usual soluble oils of commerce which are mixtures of nonpolar compounds, such as hydrocarbons, and one or more surfactants. It also includes the non-turbid oil-external dispersions containing water which are prepared from the soluble oils of commerce wherein the average diameter of the internal phase is less than the wave length of light.

The following examples more fully illustrate our invention; however, it is not intended that our invention be limited to the particular salts, the particular sulfonate surfactants, etc., shown. Rather, it is intended that all equivalents obvious to those skilled in the art be included within the scope of our invention as claimed.

*Example I*

A commercial oil-soluble alkylaromatic naphthenic monosulfonate, purchased from Shell Chemicals, having an empirical formula approximating $C_nH_{2n-10}SO_3Na$, wherein $n$ is 25–30 and the alkyl radical contains from about 5 to about 20 carbon atoms, was isolated from its solution in oil by repeated extraction of a 60% aqueous ethanol solution of the crude monosulfonate with hexane. The ethanol-water solvent was then removed and the dry monosulfonate containing some inorganic salts was taken up as much as possible in absolute ethanol and filtered. After removal of the ethanol from the filtrate, the carefully dried petronate was shown to be completely soluble in absolute ethanol, indicating the absence of any significant quantities of inorganic salts. It has an average molecular weight of about 458.

A solution of the monosulfonate purified in this manner was prepared by dissoving 1.0 g. of the dry petronate in 9.0 ml. of a stabilized straight run gasoline. A "control" system was then prepared from this solution which had the following composition:

| | Vol. percent |
|---|---|
| Water | 20 |
| Isopropanol | 4 |
| Monosulfonate-gasoline solution | 76 |

To six separate 30 ml. portions of this "control" system were added varying amounts of anhydrous sodium sulfate in order to produce systems having the indicated percentages of sodium sulfate, based upon the weight of active monosulfonate present. The resulting systems were then shaken briefly and their viscosities measured immediately if no separation of phases occurred. The systems were then allowed to stand quiescent for several days in order to observe their stability with respect to time. The following results were noted:

| Sample No. | Percent Na₂SO₄ by wt. of Active Monosulfonate | Corrected Viscosity (at 72° F.), cp. | Stability* |
|---|---|---|---|
| Control | 0 | 7.8 | Unstable.* |
| 1 | 0.248 | 6.5 | Stable. |
| 2 | 0.495 | 6.8 | Do. |
| 3 | 1.01 | 6.75 | Do. |
| 4 | 2.00 | 4.00 | Do. |
| 5 | 3.00 | | Unstable. |
| 6 | 4.00 | | Do. |

*A system is described as stable if it is clear and remains as a single phase. A system is regarded as unstable if visual haziness is apparent or if any separation into more than one phase is noted, no matter how small the second phase might be.

*Example II*

An oil-soluble sulfonate was prepared from a naphthenic neutral lubricating oil stock by well-known methods. This sulfonate, hereinafter referred to as sulfonate A, was isolated as a solution in oil containing about 70% active sulfonate. It also contained a small but undetermined quantity of inorganic salts, principally sodium sulfate and sodium sulfite. A stock solution in a stabilized straight run gasoline was prepared which contained 21.39 wt. percent of this unpurified sulfonate, and the following systems were compounded from this stock solution:

| System No. | Components | Vol. Percent | Wt. Na₂SO₄ Added, g. | Stability | Corrected Viscosity (72° F.), cp. |
|---|---|---|---|---|---|
| A-1 | Sulfonate A in Gasoline | 66.7 | 0.00 | Hazy, unstable | >30 |
| | Isopropanol | 3.3 | | | |
| | Water | 30.0 | | | |
| A-2 | Sulfonate A in Gasoline | 66.7 | *0.06 | Clear, stable | 5.0 |
| | Isopropanol | 3.3 | | | |
| | Water | 30.0 | | | |
| B-1 | Sulfonate A in Gasoline | 71.4 | 0.00 | Hazy, unstable | 9.5 |
| | Isopropanol | 3.6 | | | |
| | Water | 25.0 | | | |
| B-2 | Sulfonate A in Gasoline | 71.4 | *0.04 | Clear, stable | 7.4 |
| | Isopropanol | 3.6 | | | |
| | Water | 25.0 | | | |

* This weight represents the total amount of sodium sulfate added to 30 ml. of system A and 28 ml. of system B. The amount of sodium sulfate already present as an impurity in the original sulfonate A is not included.

*Example III*

An oil-soluble sulfonate was prepared from the same naphthenic neutral lubricating oil stock as described in Example II. In this case the oil solution was carefully and repeatedly washed before the crude sulfonate was extracted in order to remove as much as possible of the inorganic salts. This crude sulfonate (Sulfonate B) also contained about 70% active sulfonate in an oil solution. A 21.39 wt. percent solution of Sulfonate B in a stabilized straight run gasoline was prepared, and the following systems were compounded from this stock solution:

| System No. | Vol.-Percent | | | Added Na₂SO₄ g./ml. System | Stability | Corrected Viscosity, cp. |
|---|---|---|---|---|---|---|
| | Sulfonate Solution | Isopropanol | Water | | | |
| A-1 | 74.1 | 3.7 | 22.2 | 0.0000 | Clear, stable | >2,000.0 |
| A-2 | 74.1 | 3.7 | 22.2 | 0.0015 | do | 11.1 |
| A-3 | 74.1 | 3.7 | 22.2 | 0.0039 | do | 6.9 |
| A-4 | 74.1 | 3.7 | 22.2 | 0.0044 | do | 4.5 |
| B-1 | 69.0 | 3.4 | 27.6 | 0.0000 | Hazy, unstable | >2,000.0 |
| B-2 | 69.0 | 3.4 | 27.6 | 0.0014 | Unstable | |
| B-3 | 69.0 | 3.4 | 27.6 | 0.0028 | Clear, stable | 9.7 |
| B-4 | 69.0 | 3.4 | 27.6 | 0.0042 | Unstable* | *4.3 |
| C-1 | 64.5 | 3.2 | 32.3 | 0.0000 | Hazy, unstable | Gelled |
| C-2 | 64.5 | 3.2 | 32.3 | 9.0013 | do | >2,000.0 |
| C-3 | 64.5 | 3.2 | 32.3 | 0.0026 | Clear, stable | 16.0 |
| C-4 | 64.5 | 3.2 | 32.3 | 0.0039 | Unstable* | *5.3 |

* This indicates that a very small lower layer amounting to no more than 10% of the total volume separated. The viscosities shown for these systems refer to those of the upper layer which was easily decanted.

Example IV

Using the same stock solution of Sulfonate B as prepared in Example III, the effect of different salts in equimolar concentration upon the stability and viscosity of water/isopropanol/gasoline-petronate systems was studied. The following data indicate that different anions will exhibit the viscosity-decrease effect to varying degrees. Systems were prepared that were identical except for the anion present; these systems had the following composition:

|  | Vol.-percent |
|---|---|
| Sulfonate B in gasoline | 74.1 |
| Isopropanol | 3.7 |
| Water | 22.2 |

Salt concentration in final system=0.02 molar.

| System No. | Salt Used | Overnight Stability | Corrected Viscosity (at 72° F), cp. |
|---|---|---|---|
| 1* | None | Clear, stable | 2,000.0 |
| 2 | Sodium citrate | do | 5.2 |
| 3 | Sodium sulfate | do | 7.3 |
| 4 | Sodium thiocyanate | do | 8.4 |
| 5 | Sodium chloride | do | 9.5 |
| 6 | Sodium nitrate | do | 10.2 |
| 7 | Sodium acetate | do | 10.4 |

*See Example III.

Example V

Using the same straight run gasoline solution of a purified, salt-free commercial sulfonate described in Example I, the following "control" system was prepared:

|  | Vol.-percent |
|---|---|
| Sulfonate-gasoline | 33.25 |
| Isopropanol | 1.75 |
| Water | 65.00 |

As in Example I, separate aliquots of this control were treated with varying amounts of anhydrous sodium sulfate to give systems having the given percent sodium sulfate by weight of active sulfonate. This system is a milky emulsion.

| System No. | Percent Na$_2$SO$_4$ by wt. of Active Sulfonate | Corrected Viscosity (at 72° F.), cp. | Stability |
|---|---|---|---|
| Control | 0.0 | 8.35 | Stable. |
| 1 | 0.5 | 7.9 | Do. |
| 2 | 1.5 | 6.9 | Do. |
| 3 | 3.0 | 5.6 | Do. |
| 4 | 5.0 | 4.9 | Unstable. |

This example offers evidence that quantities of salt not only can be tolerated by oil-in-water systems, but also decreases the viscosities of these systems in the same manner as with water-in-oil systems.

Example VI

An oil-soluble petroleum sulfonate was prepared from a naphthenic neutral lubricating oil stock by well-known methods. The active sulfonate was isolated free of contaminating oils and inorganic salts by the general method outlined in Example I in order that the absolute allowable concentration of Na$_2$SO$_4$ might be determined.

A solution of this active material in straight run gasoline was prepared which had the following concentration:

| | |
|---|---|
| Weight-percent of active material in solution | 15.3 |
| (Volume-percent of crude material solution equivalent to) | 16.00 |
| Grams of active material/ml. of final solution | 0.11236 |

Gasoline/water/isopropanol systems were prepared from this solution as follows, and varying quantities of Na$_2$SO$_4$ (in water solution) were added to give the concentrations shown below:

| Vol. Percent | | | Wt. Percent Na$_2$SO$_4$ Based on Active Material | G. Na$_2$SO$_4$/ml. System | Stability |
|---|---|---|---|---|---|
| Water | Gasoline Solution | IPA | | | |
| 22.2 | 74.1 | 3.7 | 0.0 | 0.00000 | Stable. |
| 22.2 | 74.1 | 3.7 | 0.88 | 0.00074 | Do. |
| 22.2 | 74.1 | 3.7 | 3.44 | 0.00296 | Do. |
| 22.2 | 74.1 | 3.7 | 4.26 | 0.00370 | Do. |
| 22.2 | 74.1 | 3.7 | 5.07 | 0.00444 | Unstable. |
| 22.2 | 74.1 | 3.7 | 5.87 | 0.00519 | Do. |
| 27.6 | 69.0 | 3.4 | 4.58 | 0.00372 | Do. |
| 27.4 | 68.5 | 4.1 | 4.58 | 0.00370 | Stable. |

Example VII

The same purified oil-soluble petroleum sulfonate described in Example VI was made up to the same concentration (15.3 wt.-percent) as noted in Example VI, and the determination of the maximum allowable concentration of inorganic salt was carried out as described in Example VI. In this instance NaCl was substituted for Na$_2$SO$_4$.

| Vol. Percent | | | Wt. Percent NaCl Based on Active Material | G. NaCl/ml. System | Stability |
|---|---|---|---|---|---|
| Water | Gasoline Solution | IPA | | | |
| 22.2 | 74.1 | 3.7 | 0.0 | 0.0000 | Stable. |
| 22.2 | 74.1 | 3.7 | 1.75 | 0.00148 | Do. |
| 22.2 | 74.1 | 3.7 | 2.18 | 0.00185 | Do. |
| 22.2 | 74.1 | 3.7 | 2.60 | 0.00222 | Unstable. |
| 22.2 | 74.1 | 3.7 | 3.58 | 0.00296 | Do. |

Example VIII

A crude petroleum sulfonate was prepared in an identical manner and from the same naphthenic lubricating oil stock as described in Example II. A stock solution of this sulfonate in straight run gasoline which contained 21.39% by weight of this crude sulfonate was prepared, and the effect of chloride salts possessing different cations upon the viscosity and stability of water/isopropanol/gasoline-sulfonate systems was studied as in Example IV. Systems were prepared which were identical except for the cation of the salt; these systems had the following composition:

| | Vol.-percent |
|---|---|
| Sulfonate in gasoline solution | 74.1 |
| Isopropanol | 3.7 |
| Water | 22.2 |

Salt concentration in final system=0.02 molar.

| System No. | Salt Used | Stability | Corrected Viscosity (at 72° F.), cp. |
|---|---|---|---|
| 1 | None | Stable | >2,000 |
| 2 | Sodium chloride | do | 9.0 |
| 3 | Ammonium chloride | do | 8.2 |
| 4 | Potassium chloride | do | 6.8 |
| 5 | Magnesium chloride | Unstable | |
| 6 | Calcium chloride | do | |

The allowable maximum salt concentration must be lower for salts containing divalent cations.

Example IX

Oil is recovered from a Pennsylvanian sand of the Illinois Basin at a depth of about 950 feet by the injection of 3 slugs of soluble oil followed by a water injection through the 4 injection wells of a regular five-spot pattern. The sand section is about 10 feet in thickness, has a permeability of about 150 md. an oil saturation of about 35%, and a water saturation of 65% of the pore volume. The crude viscosity is about 7.5 cp. at 21° C.

Fifteen thousand five hundred barrels of a soluble oil are prepared containing 20% deionized water, 4% isopropanol, and 76% of a surfactant-straight run gasoline mixture. The surfactant is the same surfactant as utilized in Example I and is mixed with the gasoline at a ratio of 1.0 g. of surfactant per 9 ml. of straight run gasoline. The soluble oil is divided into 3 slugs of 1,500 bbls.; 12,500 bbls.; and 1,500 bbls. of soluble oil, respectively, and injected into the formation. Into the first and last slugs is uniformly mixed 2.0%, by weight of surfactant, $Na_2SO_4$ while 0.15%, by weight of surfactant, $Na_2SO_4$ is uniformly mixed into the 12,500-barrel slug. The viscosities of the high salt-content oil slugs are about 4.0, while the largest slug has a viscosity of about that of the crude.

After completion of injection of the soluble oil slugs, substantially pure water is injected into the formation at 60–150 bbls./day. Water injection is continued until economic recovery through the central well of the five-spot is no longer economical.

Example X

In a variation of the process of Example V, a slug of water-external emulsion having a viscosity of about 7.0 at its leading edge and about the viscosity of water at its trailing edge is injected into the formation after injection of the soluble oil and prior to the injection of water.

Acids or bases exhibit the same effects as do salts, and mixtures of acids and salts or bases can be utilized. Furthermore, the effect is not limited to soluble oils but is also applicable to water-external emulsions as shown by Example V.

Now having described our invention, what we claim is:

1. The process comprising
 (a) injecting into a petroleum-containing subterranean formation, into which at least one each of an injection well and a production well have been drilled, a soluble oil containing substantial amounts of water, at least a portion of which contains a controlled amount of a water-soluble salt effective to reduce the viscosity thereof;
 (b) thereafter injecting into the formation a drive fluid; and
 (c) recovering petroleum from the subterranean formation through the production well.

2. The process of claim 1 wherein the soluble oil contains less than about 1–4 g./l. of a water-soluble salt.

3. The process of claim 1 wherein the soluble oil contains, as the emulsifying agent, a sulfonate surfactant.

4. The process of claim 1 wherein the soluble oil contains, as an effective emulsifying agent, an alkylaryl naphthenic monosulfonate having an empirical formula approximating $C_nH_{2n-10}SO_3Na$, wherein $n=25-30$ and the alkyl radical contains from about 5 to about 20 carbon atoms.

5. The process of claim 1 wherein the water-soluble salt is selected from the group consisting of alkali metal citrates, sulfates, thiocyanates, halides, nitrates, and acetates.

6. The process of claim 1 wherein the water-soluble salt is an alkali metal sulfate.

7. The process of claim 1 wherein the water-soluble salt is an alkali metal chloride.

8. The process of claim 1 wherein the water-soluble salt is an alkali metal citrate.

9. The method of controlling the viscosity of a soluble oil suitable for petroleum recovery from subterranean formations comprising mixing into said soluble oil an amount of water-soluble salt effective to reduce the viscosity of the soluble oil while maintaining the soluble oil stable.

10. The process of claim 9 wherein the water-soluble salt is selected from the group consisting of alkali metal citrates, sulfates, thiocyanates, halides, nitrates, and acetates.

11. The process of recovering fluid hydrocarbons from subterranean formations having at least one injection well and at least one production well drilled into said formation comprising injecting into the subterranean fluid hydrocarbon-containing formation a soluble oil containing an alkylaryl naphthenic sulfonate, a portion of which contains, at the soluble oil-water interfaces, an amount of a water-soluble ionizable salt effective to reduce the viscosity of the soluble oil while maintaining the soluble oil substantially transparent.

12. The process of claim 11 wherein the viscosity of the soluble oil is regulated by mixing into the soluble oil up to about 1–4 g./l. of a water-soluble salt.

13. In the process for recovering petroleum fluids from subterranean formations containing same by driving a soluble oil containing substantial water through sand formation, the steps comprising
 (a) injecting, through at least one injection well drilled into said formation, a minor portion of a soluble oil containing an ionic surfactant and an amount of a water-soluble salt effective to reduce the viscosity of the portion of soluble oil while maintaining soluble oil as such;
 (b) injecting into the formation a soluble oil of lesser salt content and higher viscosity;
 (c) injecting a second minor portion of a soluble oil containing an amount of water-soluble salt effective to reduce the viscosity of the second minor portion of soluble oil while maintaining the soluble oil as such;
 (d) injecting, through said injection well, a drive fluid; and
 (e) recovering oil from said formation through at least one production well drilled therein.

14. The process of claim 13 wherein the minor portion of soluble oil contains less than about 1–4 g./l. of water-soluble salt.

15. The process of claim 13 wherein the water-soluble salt is selected from the group consisting of alkali metal citrates, sulfates, thiocyanates, halides, nitrates, and acetates.

16. The process of claim 13 wherein the soluble oil contains as ionic surfactant an alkylaryl naphthenic monosulfonate having an empirical formula approximating $C_nH_{2n-10}SO_3M$, wherein M is an alkali metal, $n=25-30$, and the alkyl radical contains from about 5 to about 20 carbon atoms.

17. The process of claim 16 wherein at least one portion of at least about 5–10% of the total soluble oil contains an amount of water-soluble ionizable salt greater than the remaining portion of the soluble oil.

18. The process for the recovery of petroleum fluids from subterranean formations having at least one injection well and at least one production well drilled therein comprising injecting into the subterranean formation sequentially slugs of soluble oils containing substantial amounts of water of incrementally increased salt content which causes an incremental reduction in viscosity.

References Cited

UNITED STATES PATENTS

| | | | |
|---|---|---|---|
| 2,867,277 | 1/1959 | Weinaug et al. | 166—9 |
| 2,988,142 | 6/1961 | Maly | 166—9 |
| 3,082,822 | 3/1963 | Holm et al. | 166—9 |
| 3,123,135 | 3/1964 | Bernard et al. | 166—9 |
| 3,126,952 | 3/1964 | Jones | 166—9 |
| 3,163,214 | 12/1964 | Csaszar | 166—9 |
| 3,167,118 | 1/1965 | Habermann | 166—9 |
| 3,181,609 | 5/1965 | Csaszar et al. | 166—9 |

OTHER REFERENCES

Slobod et al.: Use of a Graded Viscosity Zone to Reduce Fingering in Miscible Phase Displacements, Producers Monthly, August 1960 (pp. 12, 14–16, 18 and 19 relied on).

CHARLES E. O'CONNELL, *Primary Examiner.*

JACOB L. NACKENOFF, STEPHEN J. NOVOSAD, *Examiners.*

T. A. ZALENSKI, *Assistant Examiner.*

UNITED STATES PATENT OFFICE
CERTIFICATE OF CORRECTION

Patent No. 3,330,343                                             July 11, 1967

William C. Tosch et al.

It is certified that error appears in the above identified patent and that said Letters Patent are hereby corrected as shown below:

Column 3, line 25, "petronate" should read -- sulfonate --; line 30, "petronate" should read -- sulfonate --. Column 5, line 6, "petronate" should read -- sulfonate --.

Signed and sealed this 16th day of December 1969.

(SEAL)
Attest:

Edward M. Fletcher, Jr.                                      WILLIAM E. SCHUYLER, JR.

Attesting Officer                                                         Commissioner of Patents